US007115871B1

(12) United States Patent
Tracy et al.

(10) Patent No.: US 7,115,871 B1
(45) Date of Patent: Oct. 3, 2006

(54) FIELD COVERAGE CONFIGURABLE PASSIVE INFRARED RADIATION INTRUSION DETECTION DEVICE

(75) Inventors: Larry Tracy, Auburn, CA (US); Kiyoshi Nagaya, Yokohama (JP)

(73) Assignee: Inet Consulting Limited Company, (JP)

( * ) Notice: Subject to any disclaimer, the term of this patent is extended or adjusted under 35 U.S.C. 154(b) by 0 days.

(21) Appl. No.: 11/213,193

(22) Filed: Aug. 25, 2005

(51) Int. Cl.
*G01J 5/02* (2006.01)

(52) U.S. Cl. .................. 250/349; 250/DIG. 1; 250/342

(58) Field of Classification Search ................ 250/349, 250/DIG. 1, 342, 347; 340/567
See application file for complete search history.

(56) References Cited

U.S. PATENT DOCUMENTS

| | | | | |
|---|---|---|---|---|
| 4,321,594 | A * | 3/1982 | Galvin et al. | 340/567 |
| 4,709,151 | A * | 11/1987 | Guscott et al. | 250/342 |
| 4,999,610 | A * | 3/1991 | Guscott | 340/567 |
| 5,422,484 | A * | 6/1995 | Brogi et al. | 250/339.15 |
| 5,572,033 | A * | 11/1996 | Grant | 250/353 |
| 5,929,445 | A * | 7/1999 | Barone | 250/353 |
| 5,936,666 | A * | 8/1999 | Davis | 348/143 |
| 6,031,456 | A * | 2/2000 | Hanyuda | 340/555 |
| 6,211,522 | B1 * | 4/2001 | Kotlicki et al. | 250/353 |
| 6,239,437 | B1 * | 5/2001 | Barone | 250/353 |
| 2002/0020816 | A1 * | 2/2002 | Leen | 250/342 |

* cited by examiner

*Primary Examiner*—David Porta
*Assistant Examiner*—Mark R. Gaworecki
(74) *Attorney, Agent, or Firm*—DLA Piper Rudnick Gray Cary US LLP

(57) ABSTRACT

One embodiment of a field coverage configurable passive infrared radiation intrusion detection device comprises a plurality of passive infrared radiation sensors. The device also has an optical element for gathering infrared radiation from different portions of a field and for focusing said infrared radiation onto said plurality of passive infrared radiation sensors. An electrical activation/deactivation circuit receives the output of each passive infrared radiation sensor and selectively activates/deactivates one or more of the plurality of passive infrared radiation sensor outputs thereby configuring the portions of the field covered by the passive infrared intrusion detection device. In another embodiment of a field coverage configurable passive infrared radiation intrusion detection device, the height coverage of the device is adjustable in the field. The device comprises a passive infrared radiation sensor, and an optical element spaced apart from the passive infrared radiation sensor by a separation distance, for focusing infrared radiation from a field at a height distance from the optical element. The device further comprises means for changing the separation distance, thereby changing the height distance of the optical element from the field.

19 Claims, 4 Drawing Sheets

FIELD COVERAGE CONFIGURABLE PASSIVE INFRARED RADIATION INTRUSION DETECTION DEVICE

TECHNICAL FIELD

The present invention relates to a passive infrared radiation intrusion detection device whose coverage is field configurable, i.e. the extent of the coverage of the device can be changed at the time of installation. More particularly, the device of the present invention can be field configured laterally or in the height direction, or both.

BACKGROUND OF THE INVENTION

Passive infrared radiation intrusion detection devices are well known in the art. In the prior art, the coverage of a passive infrared radiation intrusion detection device, i.e. the lateral extent of the detection of the device, is set at the factory. Thus, if an installer at a site determines that a particular portion of a field should not be detected, because it has a heat source or otherwise contributes to false alarm, the installer does not have the flexibility to reconfigure the extent of the field coverage for that device.

Further, infrared radiation intrusion detection devices could not be adjusted in the field during installation to take into account different heights.

SUMMARY OF THE INVENTION

Accordingly, in the present invention, two embodiments of a field coverage configurable passive infrared radiation intrusion detection device are disclosed. In a first embodiment, the device comprises a plurality of passive infrared radiation sensors. The device also has an optical element for detecting intrusion in different portions of a field. An electrical activation/deactivation circuit receives the output of each passive infrared radiation sensor and selectively activates/deactivates one or more of the plurality of passive infrared radiation sensor outputs thereby configuring the portions of the field covered by the passive infrared intrusion detection device.

In a second embodiment of the device, the height coverage of the device is adjustable in the field. The device comprises a passive infrared radiation sensor, and an optical element spaced apart from the passive infrared radiation sensor by a separation distance, for focusing infrared radiation from a field at a height distance from the optical element. The device further comprises means for changing the separation distance, thereby changing the height distance of the optical element from the field.

DETAILED DESCRIPTION OF THE INVENTION

Figure 1:
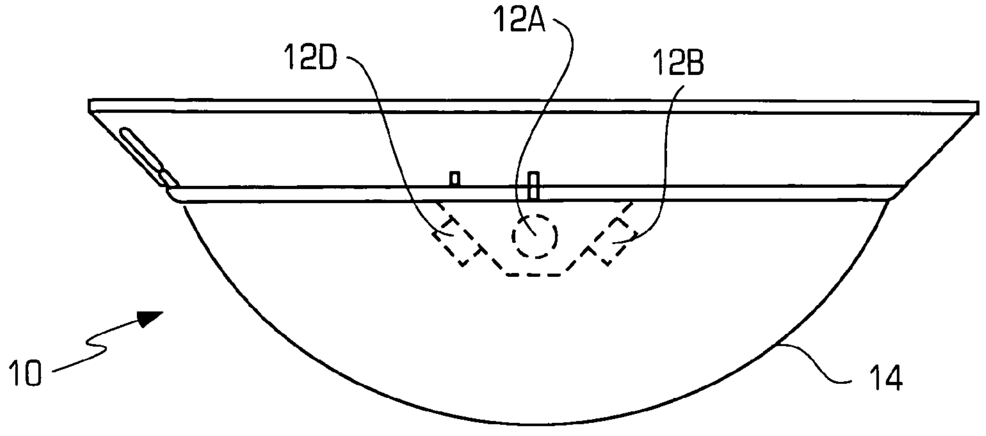
FIG. 1 is a side view of a first embodiment of a field coverage configurable passive infrared radiation intrusion detection device of the present invention.
Figure 2:
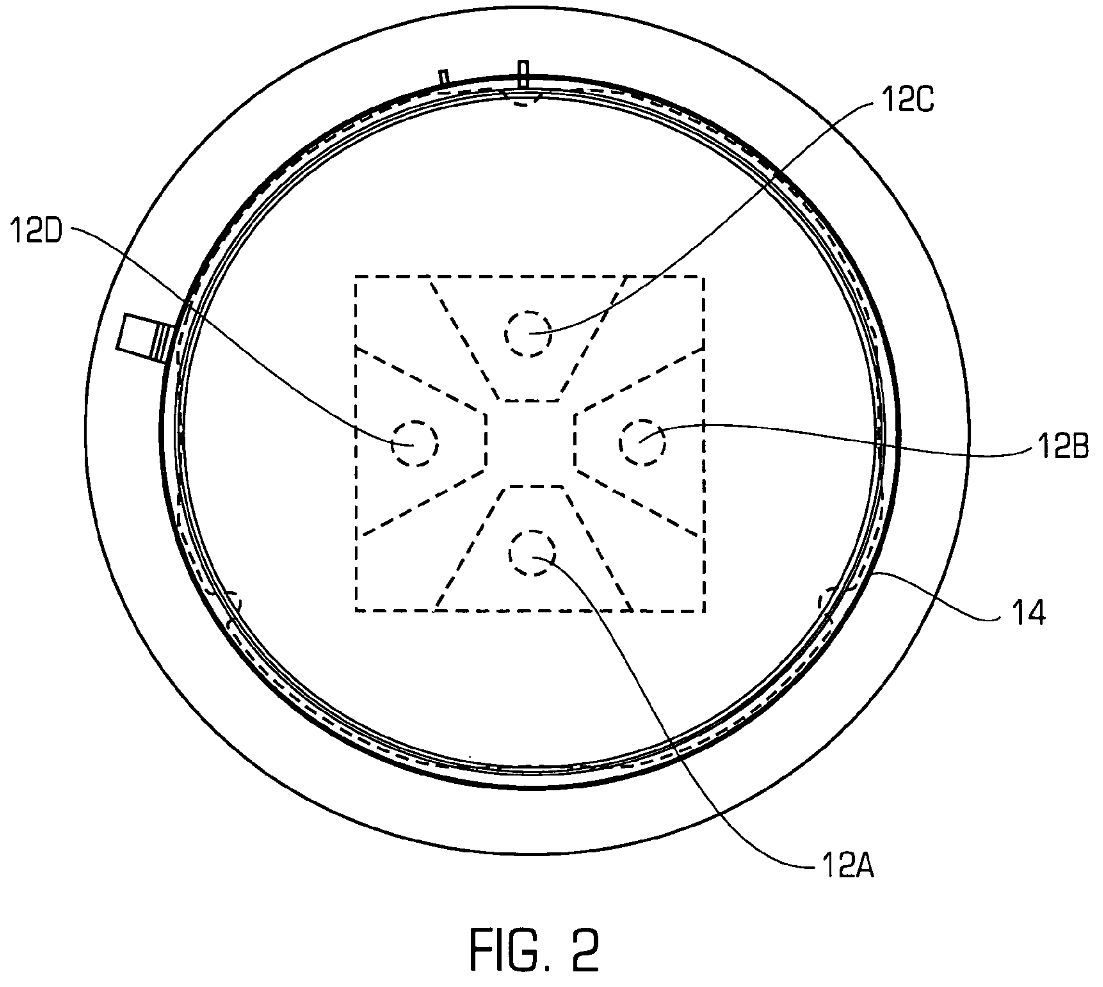
FIG. 2 is a plan view of the embodiment shown in FIG. 1.

Referring to FIG. 1 there is shown a side view of a first embodiment of a field coverage configurable passive infrared radiation intrusion detection device 10 of the present invention. The device 10 comprises a plurality of passive infrared radiation sensors (12A, 12B, 12C (shown in FIG. 2), and 12D). As shown in FIG. 2, each of the sensors 12 is positioned substantially in a rectilinear formation, i.e. spaced apart by approximately ninety (90) degrees. A single, hemispherically dome shaped, Fresnel lens or other optical element 14 surrounds the sensors 12 and gathers the infrared radiation from different portions 16(A–D) of the field and focuses them onto the plurality of sensors 12 (A–D). Of course, it is also within the scope of the present invention that the single optical element 14 can be replaced by a plurality optical elements with each optical element associated with a different passive infrared radiation sensor 12. As shown in FIG. 2, the optical element 14 is substantially hemispherically domed in shaped and covers the radiation sensors 12 and houses them. The optical element 14 also serves to gather the radiation from a plurality of different fields to focus them onto each of the different sensors 12.

Figure 3:
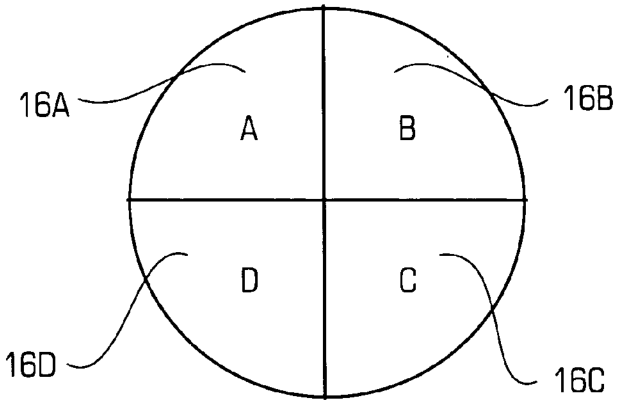
FIG. 3 is a schematic view of the different portions of a field covered by the embodiment shown in FIG. 1.

Referring to FIG. 3 there is shown a schematic view of the different portions 16 of a field covered by the device 10. As shown in FIG. 3, the field comprises four different portions: 16A, 16B, 16C and 16D. Each of the portions of the fields 16 is detected by the radiation sensor 12 with which the field is associated. Thus, for example, if an intrusion were to occur in field 16A, the infrared radiation in that field 16A would be detected by the radiation sensor 12A. Each of the fields 16 is approximately ninety (90) degrees of a circle, because there are four radiation sensors 12 covering approximately 90 degrees each.

Figure 4:
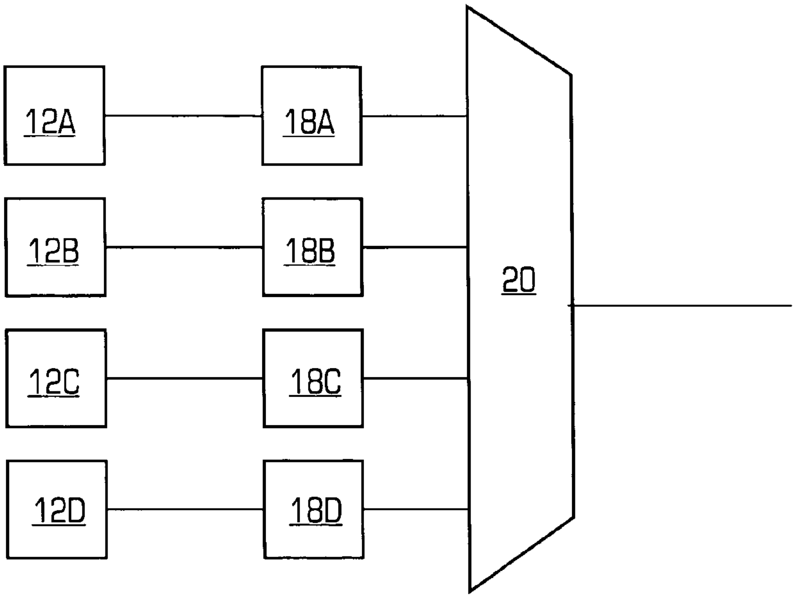
FIG. 4 is a circuit diagram showing the activation/deactivation circuit for changing the field coverage of the embodiment shown in FIG. 1.
Figure 5:
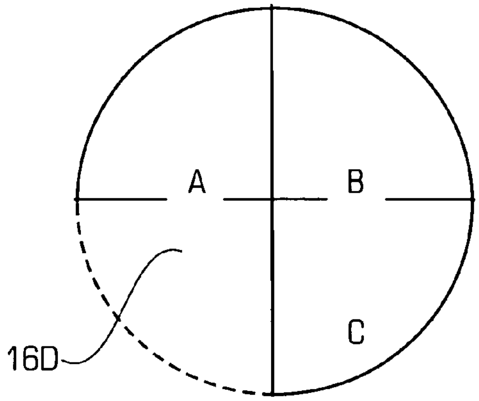
FIG. 5 is a schematic view of the portions of a field covered by the embodiment shown in FIG. 1 after its field coverage has been configured or changed.

Finally, referring to FIG. 4, there is shown a schematic circuit diagram of a portion of the detection device 10. The output of each of the radiation sensors 12 is supplied to an electrical activation/deactivation circuit 18. In one embodiment, each of the activation/deactivation circuits 18(A–D) can be a fuse or a switch. In another embodiment, the plurality of activation/deactivation circuits 18(A–D) can be replaced by a microprocessor. The output of each radiation sensor 12 is supplied to an associated electrical activation/deactivation circuit 18 which supplies the signals to a multiplex 20. The output of the multiplex 20 goes through a processing circuit, which is well known in the art, to generate an alarm signal. In operation, during the installation of the detection device 10, the installer would selectively activate or deactivate each of the circuits 18(A–D). For example, if in the field coverage shown in FIG. 3, there is a "hot spot" in the location of the field 16D which may cause the generation of a false alarm, the installer can deactivate the circuit 18D thereby preventing the output of the radiation sensor 12D from reaching the multiplex 20. In that event, it would be as if the entire field 16D is masked, as shown in FIG. 5 and the detection device 10 would then be nonresponsive to any intrusion occurring in that region 16D. The detection device 10 would respond to an intrusion that occurs in any of the regions 16A, 16B or 16C. When an intrusion occurs in any of those three regions, the sensors 12A, 12B or 12C would generate an output signal which passes through the activation/deactivation circuits 18(A–C) to the multiplex 20, which passes that signal to the processing circuit to generate the alarm.

From this, it can be seen that with the detection device 10, an installer can configure the fields that the detection device 10 can detect while in the field or during the installation period and can alter the coverage pattern for the detection device 10. Of course, the number of fields is not limited to four, which is shown only by way of example, and therefore, any number of sensors 12 can be used to divide the field into different portions.

Figure 6A:
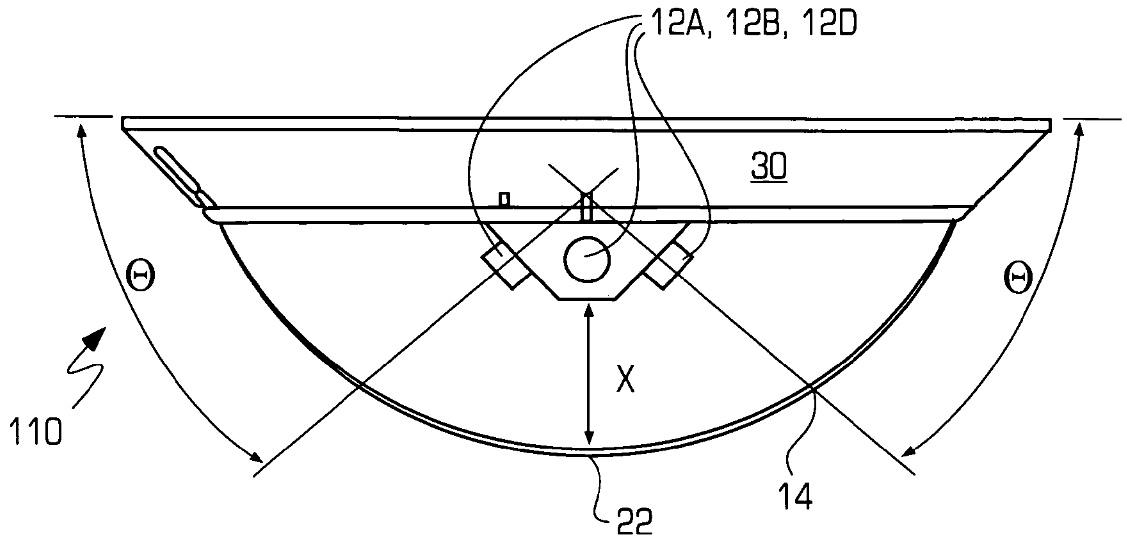
FIG. 6A is a side view of a second embodiment of a field coverage configurable passive infrared radiation intrusion detection device of the present invention, in a first configuration.
Figure 6B:
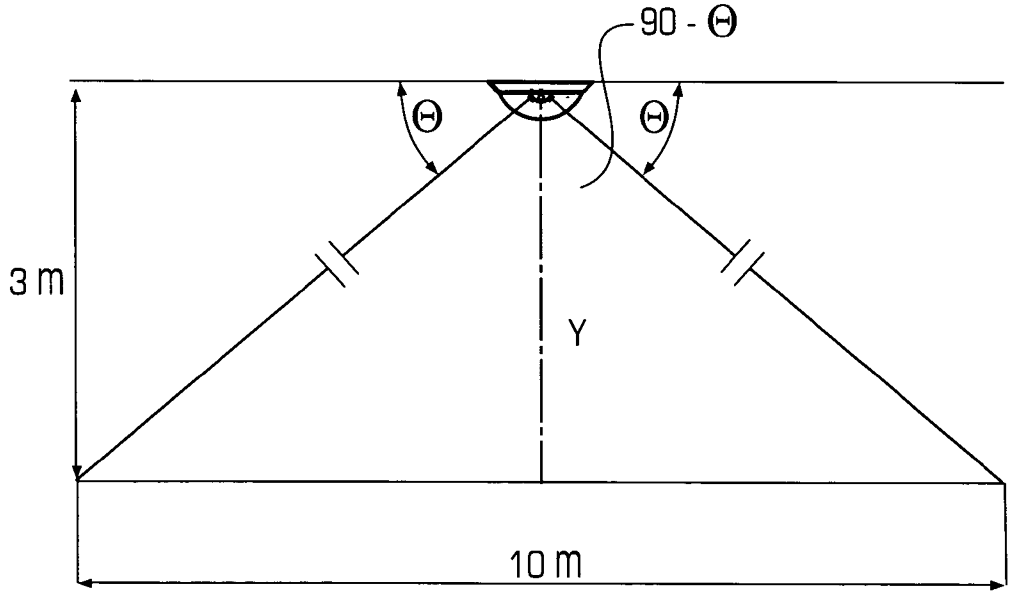
FIG. 6B is a schematic view of the portions of a field covered by the embodiment shown in FIG. 6A in the first configuration.

Referring to FIG. 6A there is shown a second embodiment of a detection device 110 of the present invention. The detection device 110 is similar to the detection device 10, shown in FIG. 1, and therefore like numerals will be used to describe same elements. Similar to the detection device 10, the detection device 110 comprises a plurality of passive infrared radiation sensors 12(A–D), but only elements 12A and 12C are shown, for illustration purposes. In addition, similar to the detection device 10, the detection device 110 comprises an optical element 14, which is a substantially hemispherically shaped dome, covering the sensors 12, for gathering infrared radiation from different portions of the field and focusing the infrared radiation onto the plurality of sensors 12. The radiation sensors 12 are mounted on a base plate 30. The hemispherically shaped optical element 14 is also mounted on the base plate 30. As shown in FIG. 6A, because the optical element 14 is hemispherically shaped, and is mounted on the base plate 30 covering the radiation sensors 12, it is spaced apart at a distance X as measured in a vertical direction from the apex or zenith 22 of the hemispherically shaped optical element 14 to the radiation sensors 12. Further, each of the sensors 12 is mounted on the base plate 30 such that they receive radiation from a field, shown in FIG. 6B, whose radiation is directed in an angle θ from the horizontal. As a result of this geometry, the hemispherically shaped optical element 14 gathers the infrared radiation from the field which is at a vertical distance Y from the detection device 110. This is shown in FIG. 6B.

Figure 6C:
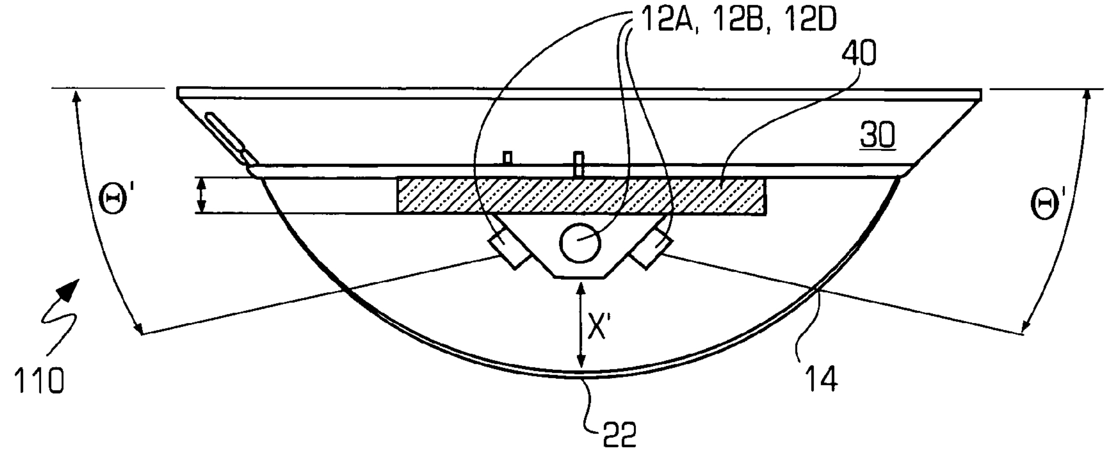
FIG. 6C is a side view of a second embodiment of a field coverage configurable passive infrared radiation intrusion detection device of the present invention, in a second configuration.
Figure 6D:
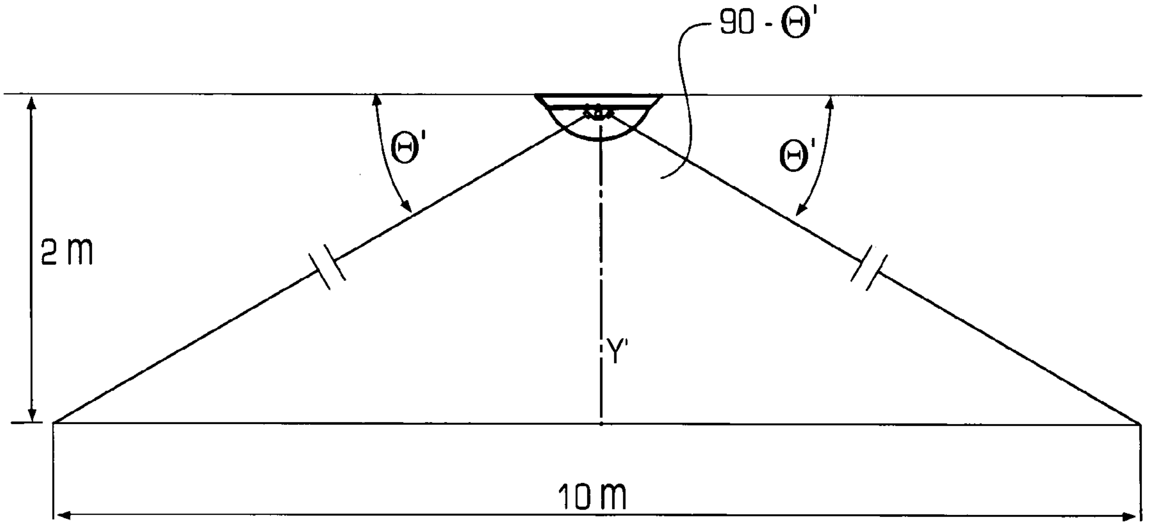
FIG. 6D is a schematic view of the portions of a field covered by the embodiment shown in FIG. 6C in the second configuration.

The detection device 110, however, unlike the device 10, is also adjustable in the vertical direction between the sensors 12(A–D) and the base plate 30. For example, as shown in FIG. 6C, a spacer 40 can be inserted between the radiation sensors 12 and the base plate 30. Other means for adjusting the distance between the radiation sensors 12 and the mounting base plate 30 can be a screw or other adjustable means. By adjusting the distance of the sensors 12 from the base plate 30, the distance X between the apex 22 of the optical element 14 and the radiation sensors 12 is also adjusted. When the distance X is adjusted, it changes the angle θ, from the horizontal, of the radiation which is received from the field and focus onto the radiation sensors 12. Thus, the adjustment of the distance X to X' shown in FIG. 6C changes the angle θ to θ' which changes the distance Y to Y' as shown in FIG. 6D. Thus, the installer can adjust in the field the vertical distance of the coverage of the detection device 110 in the field.

Of course, the embodiments shown in FIGS. 1 and 6A can be further combined into a detection device which is field coverage configurable to change the vertical high as well as lateral fields of coverage.

What is claimed is:

1. A field coverage configurable passive infrared radiation intrusion detection device comprising:
- a plurality of passive infrared radiation sensors;
- an optical element for gathering infrared radiation from different portions of a field and for focusing said infrared radiation onto said plurality of passive infrared radiation sensors; and
- an electrical activation/deactivation circuit for selectively activating/deactivating one or more of said plurality of passive infrared radiation sensors thereby configuring the portions of the field covered by said passive infrared intrusion detection device.

2. The device of claim 1 wherein said electrical activation/deactivation circuit is a plurality of fuses, with one fuse associated with each passive infrared radiation sensor.

3. The device of claim 1 wherein said electrical activation/deactivation circuit is a microprocessor.

4. The device of claim 1 wherein said electrical activation/deactivation circuit is a plurality of switches with one switch associated with each passive infrared radiation sensor.

5. The device of claim 1 wherein the number of said passive infrared radiation sensors is four.

6. The device of claim 5 wherein each of said passive infrared radiation sensor covers approximately a ninety (90) degree field of view.

7. A height coverage adjustable passive infrared radiation intrusion detection device comprising:
- a passive infrared radiation sensor;
- an optical element spaced apart from the passive infrared radiation sensor by a separation distance, for focusing infrared radiation from a field at a height distance from the optical element;
- means for changing the separation distance, thereby changing the height distance of the optical element from the field.

8. The device of claim 7 wherein said separation distance is parallel to said height distance.

9. The device of claim 8 wherein said means for changing comprises a screw for adjusting the separation distance.

10. The device of claim 8 wherein said means for changing comprises a spacer for adjusting the separation distance.

11. A field coverage adjustable passive infrared radiation intrusion detection device comprising:
- a plurality of passive infrared radiation sensors;
- an optical element, spaced apart from the plurality of passive infrared radiation sensors by a separation distance, said optical element for focusing infrared radiation from a plurality of different fields at a height distance from the optical element onto said plurality of passive infrared radiation sensors;
- means for changing the separation distance thereby changing the height distance of the optical element from the plurality of fields; and
- an electrical activation/deactivation circuit for selectively activating/deactivating one or more of said plurality of passive infrared radiation sensors thereby configuring the fields covered by said passive infrared intrusion detection device.

12. The device of claim 11 wherein said electrical activation/deactivation circuit is a plurality of fuses, with one fuse associated with each passive infrared radiation sensor.

13. The device of claim 11 wherein said electrical activation/deactivation circuit is a microprocessor.

14. The device of claim 11 wherein said electrical activation/deactivation circuit is a plurality of switches with one switch associated with each passive infrared radiation sensor.

15. The device of claim 11 wherein the number of said passive infrared radiation sensors is four.

16. The device of claim 15 wherein each of said passive infrared radiation sensor covers approximately a ninety (90) degree field of view.

17. The device of claim 11 wherein said separation distance is parallel to said height distance.

18. The device of claim 17 wherein said means for changing comprises a screw for adjusting the separation distance.

19. The device of claim 17 wherein said means for changing comprises a spacer for adjusting the separation distance.

* * * * *